United States Patent
Periaswamy et al.

(10) Patent No.: US 8,213,700 B2
(45) Date of Patent: Jul. 3, 2012

(54) SYSTEMS AND METHODS FOR IDENTIFYING SUSPICIOUS ANOMALIES USING INFORMATION FROM A PLURALITY OF IMAGES OF AN ANATOMICAL COLON UNDER STUDY

(75) Inventors: Senthil Periaswamy, Beavercreek, OH (US); Michael J. Collins, Beavercreek, OH (US); Ryan McGinnis, London, OH (US); Robert L. Van Uitert, Hollis, NH (US)

(73) Assignee: iCAD, Inc., Nashua, NH (US)

( * ) Notice: Subject to any disclaimer, the term of this patent is extended or adjusted under 35 U.S.C. 154(b) by 506 days.

(21) Appl. No.: 12/415,664

(22) Filed: Mar. 31, 2009

(65) Prior Publication Data

US 2010/0246912 A1    Sep. 30, 2010

(51) Int. Cl.
  *G06K 9/00* (2006.01)
(52) U.S. Cl. .................................................. 382/131
(58) Field of Classification Search .............. 382/130, 382/131
  See application file for complete search history.

(56) References Cited

U.S. PATENT DOCUMENTS

| | | | |
|---|---|---|---|
| 6,075,879 A * | 6/2000 | Roehrig et al. | 382/132 |
| 6,553,356 B1 | 4/2003 | Good et al. | |
| 7,224,827 B2 | 5/2007 | Acar et al. | |
| 7,298,881 B2 | 11/2007 | Giger et al. | |
| 7,333,645 B1 | 2/2008 | Mitchell et al. | |
| 7,372,988 B2 | 5/2008 | Yoakum-Stover et al. | |
| 7,756,314 B2 * | 7/2010 | Karau et al. | 382/128 |
| 2006/0215896 A1 | 9/2006 | Sirohey et al. | |

OTHER PUBLICATIONS

Napi et al., "Region-based Supine-prone Correspondence for the Reduction of False-positive CAD Polyp Candidates in CT Colonography," Academic Radiology, vol. 12, No. 6, Jun. 2005, pp. 695-707.

Wang, et al., "Automated Matching of Supine and Prone Colonic Polyps Based on PCA and SVMs," Medical Imaging 2008: Computer Aided Diagnosis, edited by Giger, Maryellen L.; Karssemeijer, Nico. Proceedings of SPIE vol. 6915, pp. 69150B-1-69150B-5 (2008).

Wang et al., "Matching Colonic Polyps from Prone and Supine CT Colonography Scans Based on Statistical Curvature Information", International Conference on Pattern Recognition, Dec. 8-11, 2008, 19th Publication, pp. 1-4.

* cited by examiner

Primary Examiner — Roy M Punnoose
(74) Attorney, Agent, or Firm — William A. Loginov, Esq.; Loginov & Associates, PLLC (57) ABSTRACT

Systems, computer-readable media, and methods are presented that identify suspicious anomalies in a colon with higher sensitivity and at a lower false positive rate. A plurality of images of an anatomical colon is acquired. Candidate suspicious anomalies are identified in each image. The candidate suspicious anomalies across images are then compared using registration and matching. Features of candidate suspicious anomalies across images may be jointly evaluated to perform classification.

59 Claims, 7 Drawing Sheets

Supine image 300
Prone image 310

SYSTEMS AND METHODS FOR IDENTIFYING SUSPICIOUS ANOMALIES USING INFORMATION FROM A PLURALITY OF IMAGES OF AN ANATOMICAL COLON UNDER STUDY

FIELD

This application discloses a computer system, a computer-readable medium, and methods for the analysis of a plurality of images of an anatomical colon under study to assist in the inspection of such images. More specifically, this application discloses systems, computer-readable media, and methods for automatically identifying and presenting suspicious anomalies such as polyps using information from multiple views of a colon.

BACKGROUND

According to the United States Cancer Statistics: 2005 Incidence and Mortality report provided by the Centers for Disease Control and Prevention, colorectal cancer is the third leading cause of cancer death among men and women in the United States. The identification of suspicious polyps in the colonic lumen may be a critical first step in detecting the early signs of colon cancer. Many colon cancers may be prevented if precursor colonic polyps are detected and removed.

Computed tomographic (CT) and magnetic resonance (MR) colonography, two non-invasive or "virtual" procedures for imaging the colonic lumen, have emerged as alternatives to the invasive optical colonoscopy procedure, which has traditionally been considered the gold standard for viewing the colon. CT imaging systems, for example, may acquire a series of cross-sectional images (i.e., slices) of the abdomen using scanners and x-rays. Computer software may be used to construct additional imagery from the slices. Physicians may inspect the imagery for indicators of colonic polyps. Recently, physicians have used computer-assisted analysis to inspect virtual colonography medical imagery and identify suspicious colonic polyps. Also known as computer-aided detection or "CAD," it has been demonstrated that physicians who use a CAD system as a "second set of eyes" benefit significantly, either by increased sensitivity and/or by reduced interpretation time. (See, for example, "Computed tomographic colonography: assessment of radiologist performance with and without computer-aided detection," Halligan et al., *Gastroenterology,* 131 (6). pp. 1690-1699.)

In a clinical setting, it is common practice to image the colon while a patient lies in multiple positions. For example, a patient's colon may be imaged while a patient lies in the prone (i.e., face down) and supine (i.e., face up) positions. Studies suggest that use of both the supine and prone positions for patients undergoing virtual colonography improves evaluation of the colon and increases sensitivity for polyp detection. (See, for example, "CT colonography: value of scanning in both the supine and prone positions," *American Journal of Roentgenology,* 1999 March; 172(3):595-599.) As virtual colonography procedures gain wider acceptance, it will also be increasingly common practice to image the colon of a patient at substantially different times (e.g., 5 or 10 years apart) to analyze changes. Typically, the multiple views of the colon are separately analyzed by a CAD system for suspicious anomalies and separately reviewed by a physician. Unfortunately, a high number of false positives are frequently detected in each view, which is undesirable to the physician or other user of the CAD system.

Prior art CAD systems and methods such as those described in U.S. Pat. No. 6,075,879, "Method and system for computer-aided lesion detection using information from multiple images," assigned to R2 Technology, Inc; and "Region-based supine-prone correspondence for the reduction of false-positive CAD polyp candidate in CT Colonography," *Academic Radiology,* Vol. 12, No. 6, June 2005, may analyze suspicious anomalies using information from multiple views. However, those systems and methods may assume that if suspicious anomalies appear in multiple images of an anatomical region of interest, they are more likely to be of interest to the physician. Unfortunately, many polyp-like false positives will persist across multiple volumes of a colon and are not eliminated using these prior art CAD systems and methods. Furthermore, many polyps will often be detectable in only one view of the colon and may be wrongly dismissed using these prior art CAD systems and methods.

It is therefore an object of this disclosure to overcome both the aforementioned and other limitations associated with prior art approaches in which information from multiple medical images is used to improve the automatic identification of suspicious anomalies in an anatomical colon.

SUMMARY

In accordance with one aspect of the present invention, there are provided methods, computer-readable media and systems comprising at least one processor, at least one storage means and at least one input device, operable to perform methods, of identifying suspicious anomalies in an anatomical colon under study, comprising: by means of at least one input device, acquiring a plurality of images of the anatomical colon; by means of at least one processor, registering at least a portion of a first acquired anatomical colon image with respect to at least a portion of a second acquired anatomical colon image; by means of at least one processor, for said first and second acquired anatomical colon images, identifying at least one candidate suspicious anomaly in said acquired anatomical colon image; by means of at least one processor, for at least one said candidate suspicious anomaly in the registered first acquired anatomical colon image, determining that at least one candidate suspicious anomaly in the registered second acquired anatomical colon image corresponds to said candidate suspicious anomaly in the registered first acquired anatomical colon image, whereby the corresponding suspicious anomalies constitute a matched set; by means of at least one processor, classifying at least one candidate suspicious anomaly in a matched set of candidate suspicious anomalies as belonging to a true positive class; and by means of at least one storage means, storing information with respect to at least one candidate suspicious anomaly in a matched set of candidate suspicious anomalies classified as belonging to a true positive class.

Optionally, the methods, media and systems may further comprise, by means of at least one output device, outputting to a user digital imagery identifying at least one candidate suspicious anomaly from a matched set of candidate suspicious anomalies classified as belonging to a true positive class. The at least one candidate suspicious anomaly from a matched set of candidate suspicious anomalies classified as belonging to a true positive class may be specially depicted using a first notation. Said first notation may be a double circle. Optionally, the methods, media and systems may further comprise, by means of at least one output device, outputting to a user digital imagery jointly identifying a matched set of candidate suspicious anomalies classified as belonging to a true positive class.

Two images of the anatomical colon may be acquired with respect to a patient in two different positions. The two different positions may be selected from a group consisting of a prone position, a supine position, a left decubitus position and a right decubitus position. Two images of the anatomical colon may be acquired at different times. At least one image may be acquired by means of a non-invasive colon imaging procedure chosen from the group consisting of computed tomography (CT) and magnetic resonance (MR) colonography.

At least one candidate suspicious anomaly may be a suspected polyp. Determining that at least one candidate suspicious anomaly in the registered second acquired anatomical colon image corresponds to said candidate suspicious anomaly in the registered first acquired anatomical colon image may comprise using information concerning locations of the candidate suspicious anomalies in the registered first and registered second acquired anatomical colon images. Determining that at least one candidate suspicious anomaly in the registered second acquired anatomical colon image corresponds to said candidate suspicious anomaly in the registered first acquired anatomical colon image further may comprise using information concerning at least one feature of the candidate suspicious anomalies in the registered first and registered second acquired anatomical colon images. Determining that at least one candidate suspicious anomaly in the registered second acquired anatomical colon image corresponds to said candidate suspicious anomaly in the registered first acquired anatomical colon image may further comprise using a classifier to evaluate a similarity of a plurality of features in the said candidate suspicious anomalies in the registered first and second acquired anatomical colon images. Classifying at least one candidate suspicious anomaly in a matched set of candidate suspicious anomalies as belonging to a true positive class may comprise using information concerning at least one feature of the said candidate suspicious anomalies in the matched set.

Optionally, the methods, media and systems may further comprise, by means of at least one processor, for at least one said candidate suspicious anomaly in the registered first acquired anatomical colon image, to which no candidate suspicious anomaly in the registered second acquired anatomical colon image corresponds, whereby the said candidate suspicious anomaly is not part of a matched set, classifying the said unmatched candidate suspicious anomaly as belonging to a true positive class; and by means of at least one storage means, storing information with respect to at least one unmatched candidate suspicious anomaly classified as belonging to a true positive class. Optionally, the methods, media and systems may further comprise, by means of at least one output device, outputting to a user digital imagery identifying at least one unmatched candidate suspicious anomaly classified as belonging to a true positive class. The at least one unmatched candidate suspicious anomaly classified as belonging to a true positive class may be specially depicted using a second notation. Said second notation may be a single circle.

Optionally, the methods, media and systems may further comprise, by means of at least one processor, classifying at least one unmatched candidate suspicious anomaly as belonging to a false positive class. Optionally, the methods, media and systems may further comprise, in response to input received from the user by means of an input device, outputting to the user digital imagery identifying a second candidate suspicious anomaly from the matched set of candidate suspicious anomalies classified as belonging to a true positive class. Optionally, the methods, media and systems may further comprise, by means of at least one processor, classifying at least one candidate suspicious anomaly in a matched set of candidate suspicious anomalies as belonging to a false positive class. Optionally, the methods, media and systems may further comprise, classifying at least one candidate suspicious anomaly in a matched set of candidate suspicious anomalies as belonging to a stool class.

In accordance with a further aspect of the present invention, there are provided methods, computer-readable media and systems comprising at least one processor, at least one storage means and at least one input device, operable to perform methods, of, by means of at least one input device, acquiring a plurality of images of the anatomical colon; by means of at least one processor, registering at least a portion of a first acquired anatomical colon image with respect to at least a portion of at least two additional acquired anatomical colon images; by means of at least one processor, for said first and at least one additional acquired anatomical colon images, identifying at least one candidate suspicious anomaly in said acquired anatomical colon image; by means of at least one processor, for at least one said candidate suspicious anomaly in the registered first acquired anatomical colon image, determining that at least one candidate suspicious anomaly in at least one of the registered additional acquired anatomical colon images corresponds to said candidate suspicious anomaly in the registered first acquired anatomical colon image, whereby the corresponding suspicious anomalies constitute a matched set; by means of at least one processor, classifying at least one candidate suspicious anomaly in a matched set of candidate suspicious anomalies as belonging to a true positive class; and by means of at least one storage means, storing information with respect to at least one candidate suspicious anomaly in a matched set of candidate suspicious anomalies classified as belonging to a true positive class.

Optionally, the methods, media and systems may further comprise, by means of at least one output device, outputting to a user digital imagery identifying at least one candidate suspicious anomaly from a matched set of candidate suspicious anomalies classified as belonging to a true positive class.

In accordance with a further aspect of the present invention, there are provided methods, computer-readable media and systems comprising at least one processor, at least one storage means and at least one input device, operable to perform methods, of, by means of at least one input device, acquiring a plurality of images of the anatomical colon; by means of at least one processor, processing the plurality of images to identify at least one suspicious anomaly appearing in at least two images of the anatomical colon; by means of at least one processor, based on locations in which the at least one suspicious anomaly appears in the at least two images, creating a display image using a portion of the at least two images, wherein the at least one suspicious anomaly is specially depicted in the display image; and by means of at least one output device, outputting to a user the display image.

Creating the display image may comprise creating a first virtual endoscopic image using at least a portion of a first acquired anatomical colon image and a second virtual endoscopic image using at least a portion of a second acquired anatomical colon image. Optionally, the methods, media and systems may further comprise, in response to input received from a user by means of an input device: based on locations in which at least one additional suspicious anomaly appears in the at least two images, creating a second display image using a portion of the at least two images, wherein the at least one additional suspicious anomaly is specially depicted in the second display image; and, by means of at least one output device, outputting to a user the second display image.

DETAILED DESCRIPTION OF EMBODIMENTS

In the following detailed description of embodiments, reference is made to the accompanying drawings that form a part hereof, and in which are shown, by way of illustration and not by way of limitation, specific embodiments in which the methods and systems disclosed herein may be practiced. It is to be understood that other embodiments may be utilized and that logical, mechanical, and electrical changes may be made without departing from the scope of the methods and systems disclosed herein.

Figure 1:
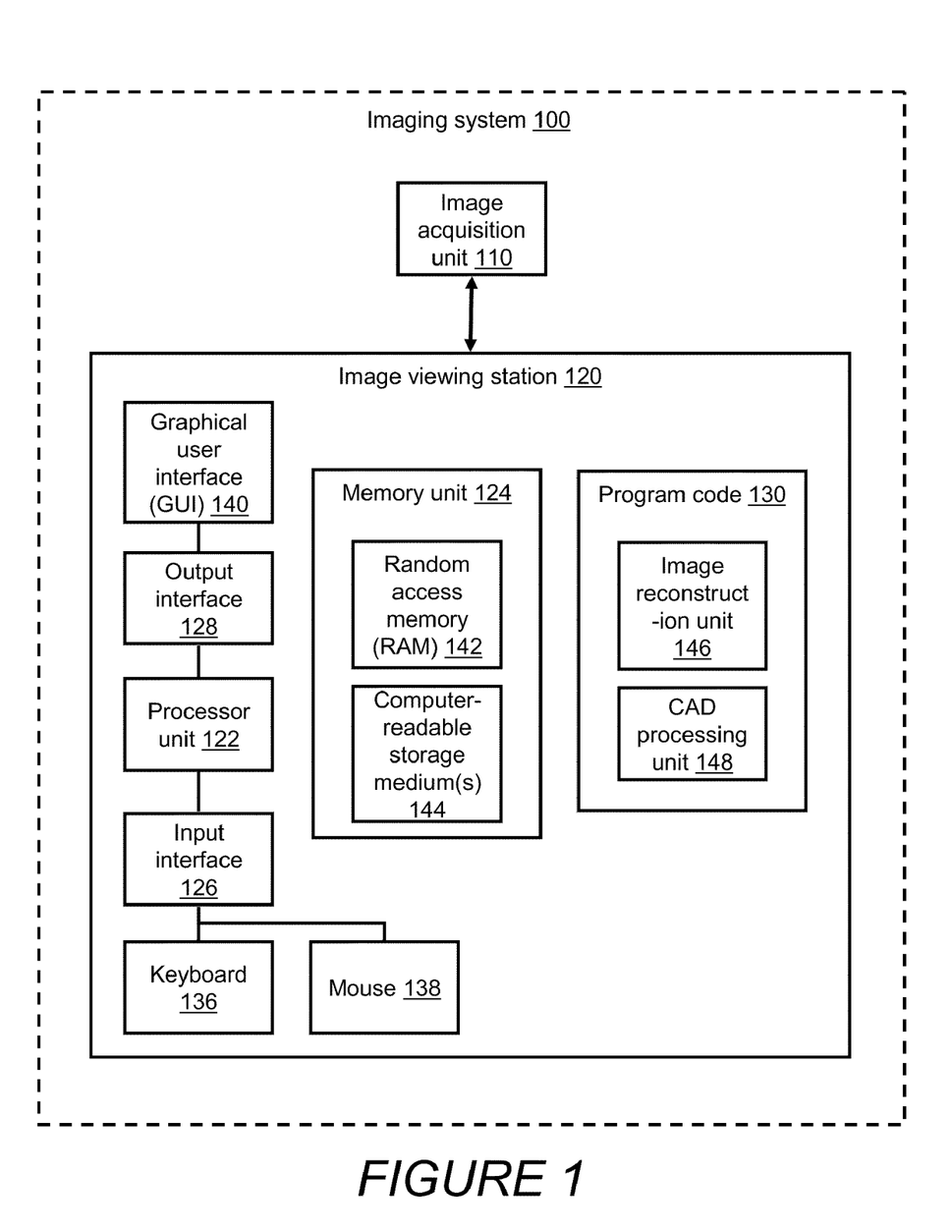
FIG. 1 is a block diagram of an illustrative system for acquiring and processing a plurality of digital images of an anatomical colon under study.

This disclosure is directed to a computer system, a computer-readable medium, and methods for the analysis of a plurality of images of a colon to assist in the inspection of such images. FIG. 1 is a block diagram of an illustrative system 100 for acquiring and processing one or more digital representations of an anatomical colon under study. More specifically, system 100 may be suitable for identifying suspicious objects such as (but not limited to) polyps using information from a plurality of images of an anatomical colon under study in accordance with the methods disclosed herein. The system described is for reference purposes only. Other systems may be used in carrying out embodiments of the methods disclosed herein.

System 100 includes an image acquisition unit 110 for performing a medical imaging procedure of a patient's colon and an image viewing station 120 for processing and displaying colon imagery to a physician or other user of the system. Image acquisition unit 110 may connect to and communicate with image viewing station 120 via any type of communication interface, including but not limited to, physical interfaces, network interfaces, software interfaces, and the like. The communication may be by means of a physical connection, or may be wireless, optical or of any other means. It will be understood by a person of skill in the art that image acquisition unit 110 and image viewing station 120 may be deployed as parts of a single system or, alternatively, as parts of multiple, independent systems, and that any such deployment may be utilized in conjunction with embodiments of the methods disclosed herein. If image acquisition unit 110 is connected to image viewing station 120 by means of a network or other direct computer connection, the network interface or other connection means may be the input device for image viewing station 120 to receive imagery for processing by the methods and systems disclosed herein. Alternatively, image viewing station 120 may receive images for processing indirectly from image acquisition unit 110, as by means of transportable storage devices (not shown in FIG. 1) such as but not limited to CDs, DVDs or flash drives, in which case readers for said transportable storage devices may function as input devices for image viewing station 120 for processing images according to the methods disclosed herein.

Image acquisition unit 110 is representative of a system that can acquire imagery of a patient's abdominal region using non-invasive imaging procedures (e.g. a virtual colonography imaging procedure). Such a system may use computed tomography (CT), magnetic resonance imaging (MRI), or another suitable method for creating images of a patient's abdominal and colonic regions as will be known to a person of skill in the art. Examples of vendors that provide CT and MRI scanners include the General Electric Company of Waukesha, Wis. (GE); Siemens AG of Erlangen, Germany (Siemens); and Koninklijke Philips Electronics of Amsterdam, Netherlands.

Image viewing station 120 is representative of a system that can analyze the medical imagery and output both the medical imagery and the results of its analysis. Image viewing station 120 may further comprise a processor unit 122, a memory unit 124, an input interface 126, an output interface 128, and program code 130 containing instructions that can be read and executed by the station. Input interface 126 may connect processor unit 122 to an input device such as a keyboard 136, a mouse 138, and/or another suitable device as will be known to a person of skill in the art, including for example and not by way of limitation a voice-activated system. Thus, input interface 126 may allow a user to communicate commands to the processor. One such exemplary command is the execution of program code 130 tangibly embodying the automated suspicious anomaly identification methods disclosed herein. Output interface 128 may further be connected to processor unit 122 and an output device such as a graphical user interface (GUI) 140. Thus, output interface 128 may allow image viewing station 120 to transmit data from the processor to the output device, one such exemplary transmission including medical imagery and suspicious anomalies automatically identified using the methods disclosed herein for display to a user on GUI 140.

Memory unit 124 may include conventional semiconductor random access memory (RAM) 142 or other forms of memory known in the art; and one or more computer readable-storage mediums 144, such as a hard drive, floppy drive, read/write CD-ROM, tape drive, flash drive, optical drive, etc. Stored in program code 130 may be an image reconstruction unit 146 for constructing additional imagery of the anatomical colon (e.g., virtual endoscopic or "filet view" colon imagery) from the images acquired by image acquisition unit 110 that enable a physician to inspect the colon; and a computer-aided detection (CAD) processing unit 148 for automatically identifying suspicious objects such as polyps using information from a plurality of images of an anatomical colon under study in accordance with the methods disclosed herein. Program code 130 may be stored in one or more computer readable-storage mediums 144.

While image reconstruction unit 146 and CAD processing unit 148 are depicted as being components within image viewing station 120, one skilled in the art will appreciate that such components may be deployed as parts of separate computers, computer processors, or computer systems. For example, image reconstruction unit 146 may be deployed as part of a virtual colonography review workstation system (e.g., V3D-Colon™ from Viatronix, Inc. of Stony Brook, N.Y.). By the same token, the end user may view images which incorporate the results of the methods set forth hereinbelow on a viewing station, computer, terminal, workstation or the like which is separate from the computer-aided detection (CAD) processing unit which processes the imagery according to the methods described hereinbelow.

Figure 2:
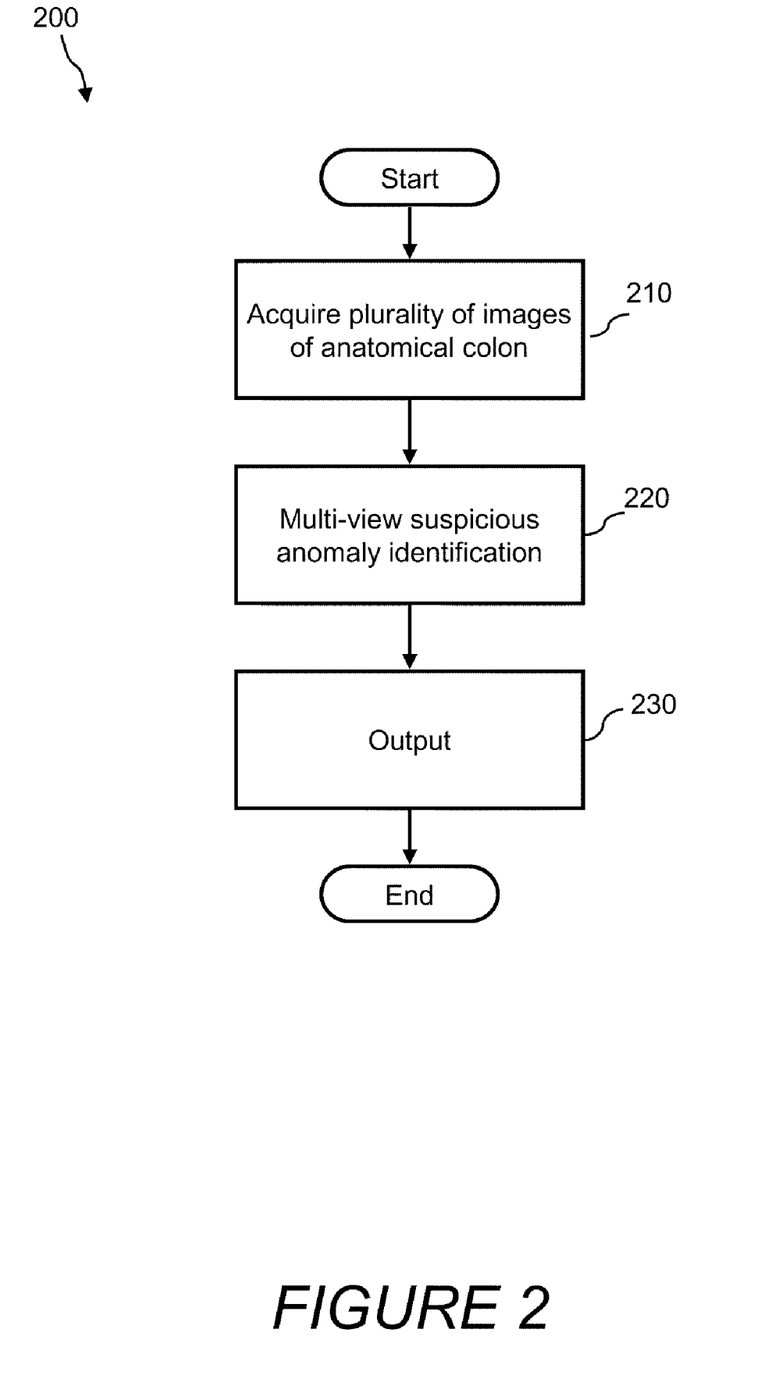
FIG. 2 is a flowchart showing a method of automatically identifying and outputting suspicious anomalies using information from a plurality of images of an anatomical colon under study.

FIG. 2 is a flowchart showing a method 200 of automatically identifying and outputting suspicious anomalies using information from a plurality of images of an anatomical colon under study. The methods illustrated in FIG. 2 may be performed using system 100 or other suitable computer system. As shown in FIG. 2, the overall steps performed in method 200 include a colonic image acquisition step 210 in which a plurality of medical images representing an anatomical colon is acquired for further processing; a suspicious anomaly identification step 220 in which suspicious anomalies such as polyps are identified using information extracted from the plurality of medical images acquired; and a suspicious anomaly output step 230 in which information regarding the identified suspicious anomalies is output to a physician. As will be further described below, in certain embodiments of this disclosure suspicious anomalies may be: identified in a colon with a higher sensitivity and/or at a lower false positive rate than prior art techniques by matching candidate suspicious anomalies in the multiple image views and evaluating feature information extracted in response to the results of matching. In certain embodiments of this disclosure, identified suspicious anomalies may be presented to a physician in various ways that may improve the inspection of the multiple image views of the anatomical colon. These steps of method 200 will now be described in greater detail.

Figure 3:
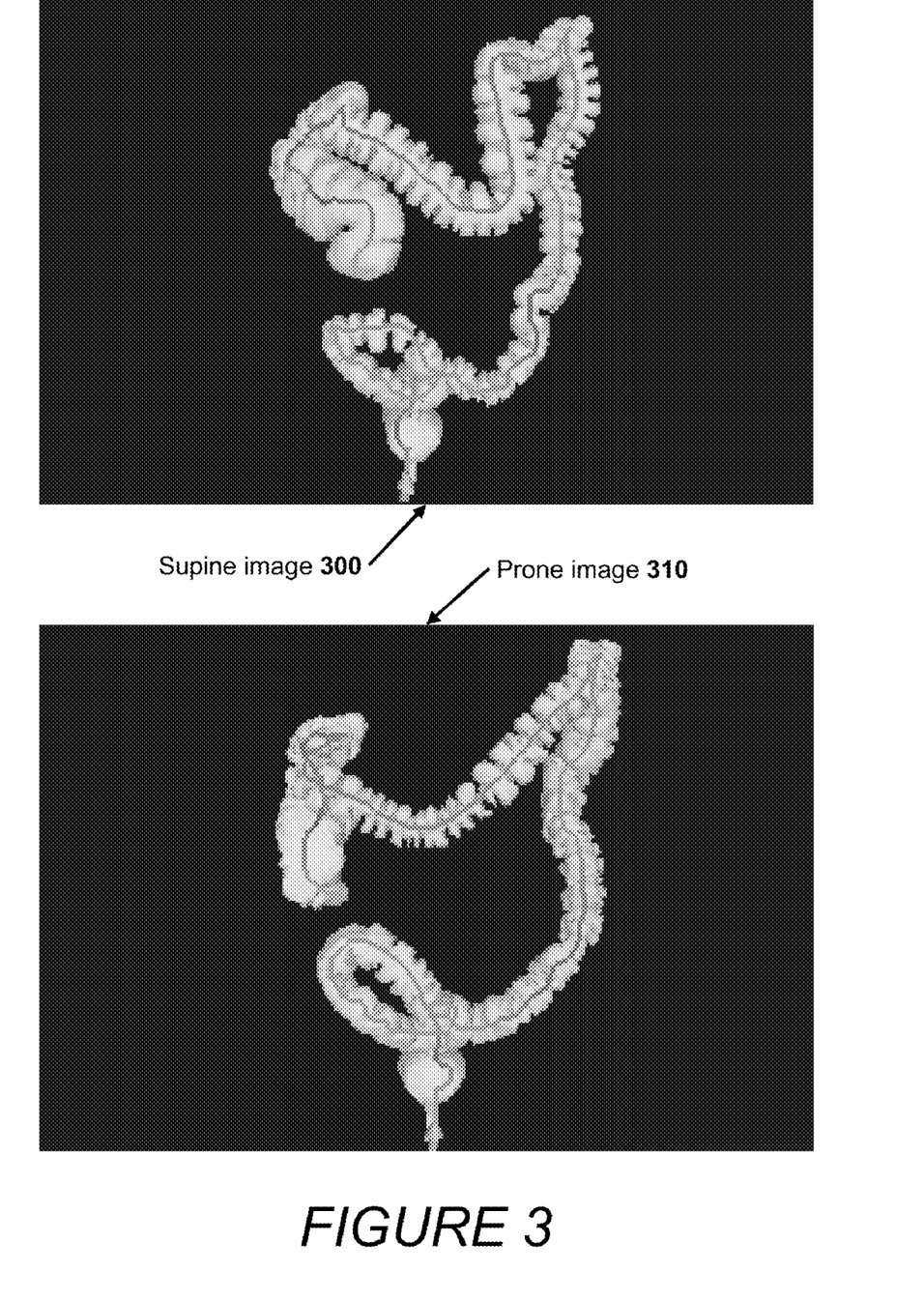
FIG. 3 illustrates images of an exemplary anatomical colon acquired from a prone position and a supine position.

At colon acquisition step 210, the medical imagery representing an anatomical colon may be acquired by performing a non-invasive colon imaging procedure such as computed tomography (CT) or magnetic resonance (MR) colonography. Such procedures may be performed by operating image acquisition unit 110 or other suitable imaging system to image a patient's abdominal region. In one embodiment of the present disclosure, exactly two anatomical images may be acquired at step 210 for further processing in accordance with the systems and methods described herein. The first anatomical image may be acquired while the patient lies in the prone position and the second anatomical image may be acquired while the patient lies in the supine position. Prone and supine position images are routinely acquired during a single non-invasive colon imaging procedure and may be termed "a series." Alternatively, the first anatomical image may be acquired while the patient lies in a first decubitis position (e.g., on the patient's left side) and the second anatomical image may be acquired while the patient lies in a second decubitis position (e.g., on the patient's right side). This imagery therefore allows the identification of anomalies of interest by analyzing a colon from different viewpoints at nearly the same point of time. In other embodiments of the present disclosure, both the first and second anatomical images may be acquired while the patient lays in either the prone or supine positions. Such imagery may be acquired during multiple non-invasive colon imaging procedures, such as those procedures in which a patient's colon is imaged at one point in time and then reimaged at a later point in time (e.g., approximately 5 or approximately 10 years later). This imagery therefore may allow the identification of anomalies of interest by analyzing a colon from nearly the same viewpoint at different points in time. One skilled in the art will further appreciate that the advantages of the present disclosure may also be realized by using more than two images. For example, it may be desirable to identify suspicious anomalies using information obtained from a colon both at different points in time and from different viewpoint angles, or from more than two viewpoint angles. Certain embodiments of the remainder of this disclosure will be described with reference to acquiring a prone volume and a supine volume of an anatomical colon under study, examples of which are illustrated in FIG. 3, but it will be understood that the choice of these images is illustrative only, and is not intended to limit the scope of the methods and systems disclosed herein.

The medical imagery acquired may be a plurality of cross-sectional, two-dimensional (2-D) images of a patient's abdomen. In certain other embodiments, the medical image data may be one or more three-dimensional (3-D) volumetric images or "volumes" of the patient's abdomen. A suitable volumetric image may be constructed from acquired cross-sectional images using computer software. For example, cross-sectional images generated using image acquisition unit 110 may be transferred to image viewing station 120, where image reconstruction unit 146 may construct a 3-D volume of the abdominal region by performing a filtered backprojection or other suitable volumetric reconstruction algorithm on the cross-sectional images. The volumetric image may be comprised of a series of slices. By way of a non-limiting example, each slice image in the volume may be constructed at 512×512 pixels and a spatial resolution of 0.75 millimeters×0.75 millimeters, and the medical image volume may be comprised of a total of 300-600 slices with a spatial resolution of 1 millimeter. The systems and methods described herein will be described as being performed on both prone and supine colon volumes. However, one skilled in the art will appreciate that one could realize the advantages of the present disclosure by performing the methods on the individual cross-sectional images (i.e., slices) representing a prone and supine colon or, alternatively, some hybrid combination of prone/supine slices and volumes.

Figure 4:
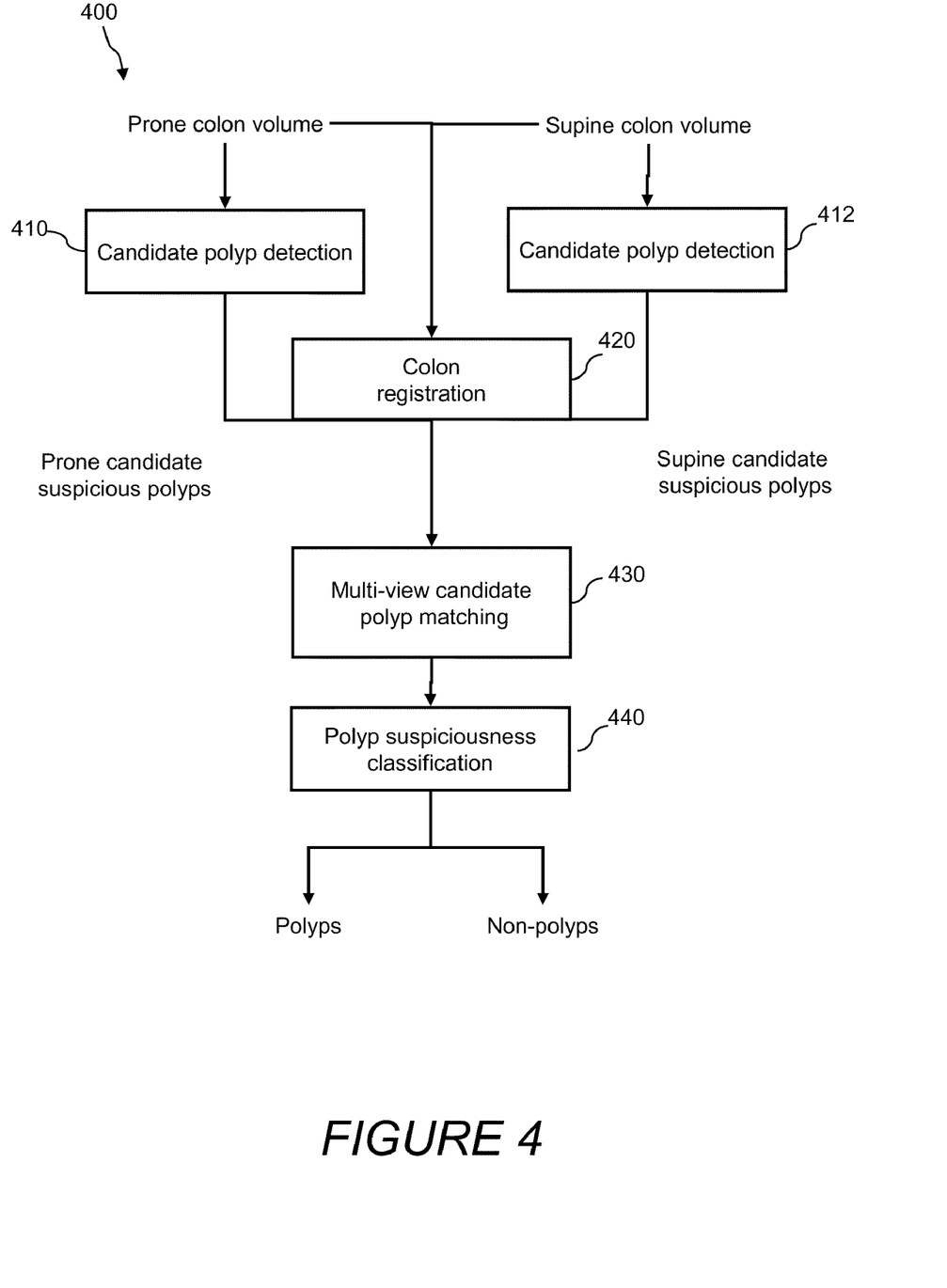
FIG. 4 is a flowchart showing a method that may be performed to automatically identify suspicious polyps using information from a plurality of images of an anatomical colon under study in accordance with certain embodiments of the systems and methods disclosed herein.

Suspicious anomaly identification step 220 is then performed using information extracted from the multiple acquired colonic images to automatically identify suspicious anomalies that may be of interest to a physician. Certain embodiments will be described with reference to identifying suspicious colonic polyps; however, other anomalies of interest to a physician such as stool may also be identified, and it is to be understood that methods and systems described herein with reference to polyp detection may be applied, with modifications that will be apparent to one of skill in the art, to detection of other objects. FIG. 4 is a flowchart showing the steps of a method 400 that may be performed to automatically identify suspicious polyps at step 220 in accordance with one embodiment of this disclosure. Each step will first be described in brief detail. A candidate polyp detection step is independently performed on a prone volume at step 410 and a supine volume at step 412 to identify two sets of candidate suspicious polyps in the anatomical colon. At step 420, a colon registration process is performed to create transformation parameters between the anatomical colon in the prone and supine volumes, thus allowing more accurate comparisons between the suspicious polyps detected in both volumes. At step 430, a multiple-view candidate polyp matching step is performed to identify, for each candidate suspicious polyp detected in one volume (e.g., the prone volume) of the colon, candidate suspicious polyps in the other volume (e.g., the supine volume) that represent highly-likely "matches" of the candidate suspicious polyp. In one non-limiting embodiment of the disclosure, the features of candidate suspicious polyps in corresponding regions of the anatomical colon may be evaluated to compute highly-likely matches. Then, each candidate suspicious polyp may be labeled (i.e., classified) as belonging to a specific class (for example, a true positive class or a false positive class) at step 440 based on the multiple-view candidate polyp matching results. The term "true positive class" when used herein represents a class of suspicious objects—in this embodiment, polyps—that appear suspicious in a single volume of the colon and are further confirmed to be suspicious upon using information available in additional volume(s) of the colon. The term "false positive class" represents a class of candidate suspicious objects—in this embodiment, polyps—that appear suspicious in a single volume of the colon, but upon using information available in additional volume(s) of the colon, are instead determined to be non-suspicious. These terms are intended to be applied to objects prior to their review by a physician or other user. In one non-limiting embodiment of the disclosure, classification of candidate suspicious polyps for which at least one highly-likely matching candidate suspicious polyp is identified in another view may be accomplished by classifying jointly its features and the features extracted from the at least one highly-likely match. Classification of candidate suspicious polyps for which no highly-likely match was identified may be computed by singularly classifying its features. Each step of method 400 will now be described in further detail.

Polyp candidate detection steps 410 and 412 are independently performed on each colon volume (i.e., each "single view") to identify the image units (e.g., the voxels or the pixels) of regions representing suspicious polyps that may be of interest to a physician. Polyps are frequently characterized by the fact that they are round, soft tissue intensity structures attached to the surface of the colon wall. Unfortunately, many non-polyps will share these characteristics. For example, normal tissue such as untagged residual stool, folds, and the ileocecal valve may often be detected as polyp candidates. Thus, it is reasonable to expect that a first plurality or "set" of candidate suspicious polyps comprising both actual polyps and non-polyps that exhibit polyp-like characteristics in at least a single view in the anatomical colon will be identified in the prone volume and a second plurality or "set" of candidate suspicious polyps comprising both actual polyps and non-polyps in the anatomical colon will be identified in the supine volume. In fact, the methods described herein may be performed when the sensitivity/specificity threshold (i.e., the operating point) of polyp candidate detection is set such that the number of candidate suspicious polyps that are detected in both the prone and supine volumes range between approximately 10-200 suspicious polyp anomalies detected per series (i.e., approximately 5-50 suspicious polyp anomalies detected per volume) at an optimal sensitivity (e.g., as close to 100% as possible). Such an operating point range provides a workable number of suspicious polyp anomalies for corresponding (i.e., matching) across colon volumes as will be further described below. However, as few as one suspicious polyp anomaly could also be matched in accordance with the methods disclosed herein.

There are many techniques (i.e., "polyp detection algorithms") known in the prior art for automatically identifying (i.e., detecting) candidate suspicious polyps in a colon, which may be employed at steps 410 and 412. Such techniques may compute measures of curvature, shape index, sphericity, and/or other geometric features on the imagery to identify clusters of pixels or voxels that have general, polyp-like characteristics. One suitable polyp detection algorithm can be seen in U.S. Pat. No. 7,236,620, "Computer-aided detection methods in volumetric imagery," assigned to iCAD, Inc., which is incorporated herein by reference. In the '620 patent, suspicious polyps may be identified within an image mask of a segmented colonic region using spherical summation techniques. A suitable means for segmenting the colon from the rest of the body and non-body imagery (i.e., a "colon segmentation algorithm") can be seen in U.S. Pat. 6,246,784, "Method for segmenting medical images and detecting surface anomalies in anatomical structures," assigned to the United States of America as represented by the Secretary of the Department of Health and Human Services, which is incorporated herein by reference. In the '784 patent, a region growing technique is described for identifying and segmenting the air, fluid, and wall of a colon. However, other techniques described in the prior art may also be performed to segment the colon prior to the detection of candidate suspicious polyps.

It is also known in the art that following the detection of candidate suspicious polyps, a segmentation step may be performed to improve the computed boundary or region identifying each candidate. Two suitable means for segmenting candidate suspicious polyps in a colon (i.e., "polyp segmentation algorithms") are active contours or deformable surfaces. See, for example, "3D colonic polyp segmentation using dynamic deformable surfaces," Yao et al., *Medical Imaging* 2004: *Proceedings of the SPIE*, Volume 5369, pp. 280-289 (2004).

One skilled in the art will appreciate that many polyp detection algorithms operate such that hundreds of suspicious polyp anomalies (e.g., anywhere from 200-900 individual regions) may be detected in a single colon volume. Thus, to achieve the range of 10-200 suspicious polyp anomalies per series, a subsequent classification step may be performed that attempts to independently label candidate suspicious polyps detected in each volume as being not of interest by analyzing various features and/or feature vectors of each candidate suspicious polyp in a single volume. Suitable techniques include, but are not limited to, those described in references such as: "Computer-assisted detection of colonic polyps with CT colonography using neural networks and binary classification trees," *Medical Physics*, Volume 30, Issue 1, pp. 52-60 (January 2003) by Jerebko et al.; "Multiple Neural Network Classification Scheme for Detection of Colonic Polyps in CT Colonography Data Sets," *Academic Radiology*, Volume 10, Issue 2, Pages 154-160 by Jerebko. et al.; "Support vector machines committee classification method for computer-aided polyp detection in CT colonography," *Academic Radiology*, Volume 12, Issue 4, Pages 479-486, by Jerebko et al.; U.S. Pat. Nos. 7,260,250 and 7,440,601 to Summers et al.; U.S. application Ser. No. 12/179,787 to Collins et al; and U.S. application Ser. No. 12/357,545, to Van Uitert et al. In accordance with certain embodiments of the disclosure, each candidate suspicious polyp may be assigned a probability of belonging to a class (e.g., a true positive class or a false positive class) based on the classification of its features as determined in a single view of the colon.

Polyp candidate detection steps 410 and 412 may be configured such that both the prone and supine volumes are processed in parallel or, alternatively, such that the processing of each volume is performed in succession by imaging system 100. In certain embodiments, the same algorithms described hereinabove (e.g., colon segmentation algorithm, polyp detection algorithm, polyp segmentation algorithm, polyp classification algorithm) may be performed on both the prone and supine volumes as part of steps 410 and 412. However, it may also be feasible to perform different sets of algorithms on the prone and supine volumes as a means to independently identify candidate suspicious polyps in each volume.

Colon registration step 420 is performed to enable the transforming of the candidate suspicious polyps in each colon image into a single coordinate system, thus enabling comparisons between structures detected in each volume of the colon. Because candidate suspicious polyps may be detected in any portion of an anatomical colon, the entire colon in the prone and supine volumes may be registered. Numerous operations for registering the colonic region of prone and supine volumes have been described in the prior art. Many such techniques may be employed at step 420 that output transformation parameters suitable for comparing features of suspicious polyp structures in different images. For example, a stretching or shrinking method that uses a plurality of anatomical landmarks in the colon may be employed. A method that uses features along a computed centerline of the colon may be employed. A distance transform method that uses a plurality of anatomical landmarks in the colon may be employed. A dynamic programming method may be employed. A surface-level registration method using the teniae coli may be employed. Additional registration methods not disclosed by way of example in this disclosure may also be employed at step 420.

Colon registration step 420 may be performed before, after, or in parallel with the processing of each volume at candidate detection steps 410 and/or 412. Any such configurations may be possible in a computer system suitable for performing the methods disclosed herein, such as imaging system 100, because the registration step need not rely on output from the candidate detection step and conversely, because the candidate detection step does not rely on output from the registration step. However, one could also realize the advantages of the disclosure by dynamically registering only an applicable portion or portions of the colon based on the results of the single-view candidate polyp detection step. Location coordinate information of each candidate suspicious polyp in each registered prone and supine volume, which is a typical output of candidate polyp detection algorithms, may be extracted and used as input parameters to such a dynamic registration procedure.

Figure 5:
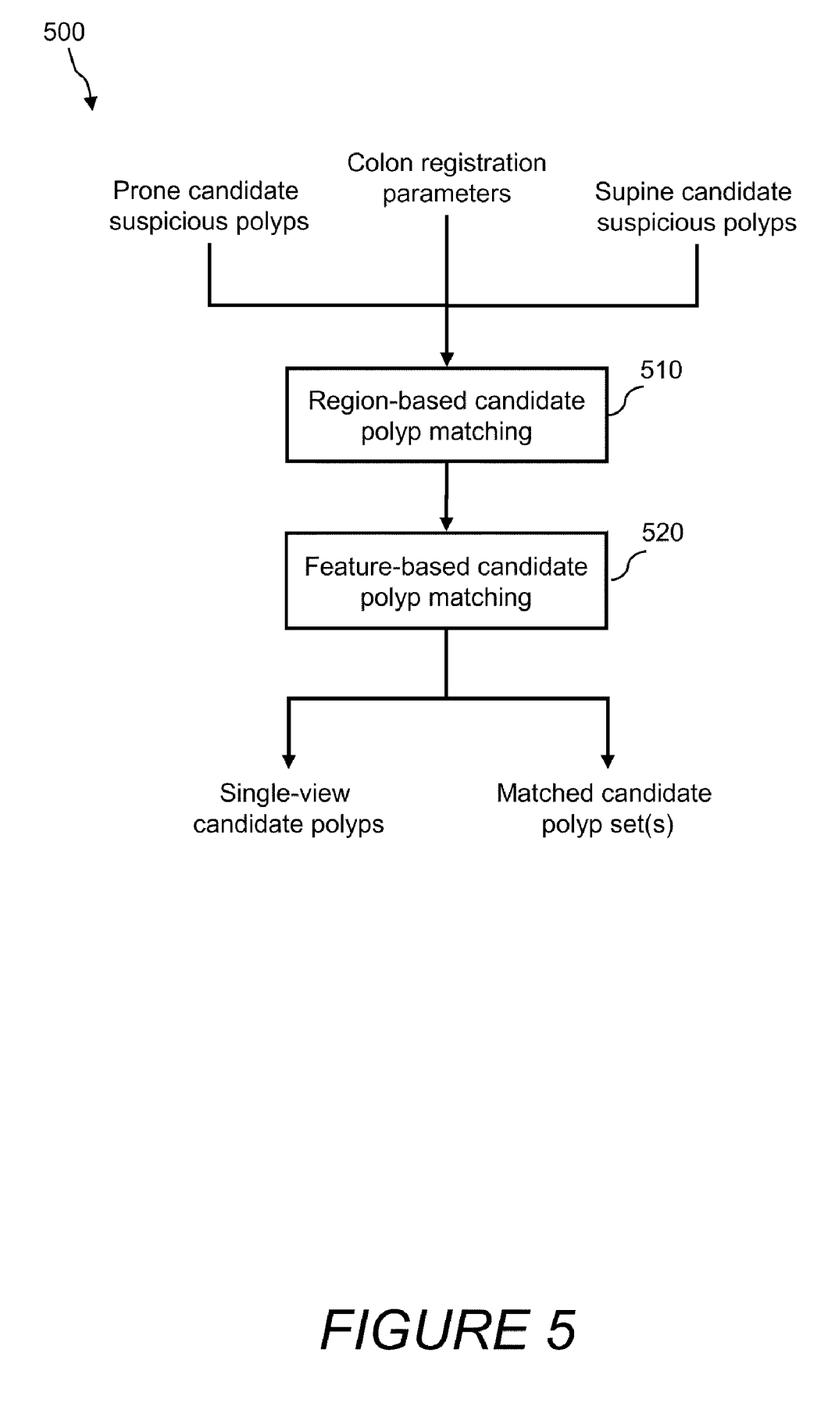
FIG. 5 is a flowchart showing a method that may be performed to match candidate suspicious polyps identified in a plurality of images of an anatomical colon under study in accordance with certain embodiments of the systems and methods disclosed herein.

Multiple-view candidate polyp matching step 430 is then performed to identify, for each candidate suspicious polyp detected in one volume of the colon, candidate suspicious polyps in the other volume that represent highly-likely "matches" of the candidate suspicious polyp. FIG. 5 is a flowchart showing an overview of a method 500 that may be performed to match candidate suspicious polyps identified in a prone volume and a supine volume of an anatomical colon in accordance with a non-limiting embodiment of the disclosure. As shown in FIG. 5, the overall steps performed in method 500 include a region-based matching step 510 in which candidate suspicious polyps in specific "search areas" (i.e., colonic regions) of both registered volumes are identified as potential matches, followed by a multiple view feature-based matching step 520 in which the features of candidate suspicious polyps in each specific colonic region are jointly evaluated to identify highly-likely matches. Having briefly introduced the overall steps performed in FIG. 5, each step will now be described in further detail.

At region-based candidate polyp matching step 510, search areas may be created that are large enough that should a candidate suspicious polyp be detectable in both volumes, it would be encapsulated in both the prone search area and corresponding supine search area. Each search area may be large enough that a candidate suspicious polyp is not encapsulated between search areas due to patient movement from imaging procedures, movement of the candidate suspicious polyp, sensitivities to registration, etc. In accordance with an embodiment of the disclosure, because candidate suspicious polyps may appear in any region of the colon, the entire colonic region in the prone and supine volumes may be segmented into colonic sub-regions as a means to create suitable search areas. For example, the registered colonic volumes may be segmented into regions according to a predetermined length parameter of approximately 100 mm. Regions may also be segmented according to a predetermined overlap parameter of approximately 30 mm between adjacent colonic regions. However, these parameters are merely exemplary and different predetermined parameters may be employed based upon factors such as the accuracy of the various algorithms described herein, and in particular, based upon the accuracy of the registration operation employed and the number of suspicious polyp anomalies detected per series. Alternatively, search areas may be created dynamically using parameters based on location coordinate information of candidate suspicious polyps. For example, given two candidate suspicious polyps detected 12 cm and 15 cm from a registered anatomical landmark in the prone volume of the colon, a search area of 7-20 cm from the same registered anatomical landmark in the supine volume may be identified as a search area whereby an empirically determined parameter of +/−5 cm is used to dynamically define a search area. Again, these parameters are merely exemplary.

The candidate suspicious polyps detected in each single-view at steps 410 and 412 that appear within the same search region are considered candidate "matches." At feature-based matching step 520, the features of candidate suspicious polyps in each search region are evaluated to further match candidate suspicious polyps.

In a non-limiting embodiment of the disclosure, the features of each candidate suspicious polyp in a prone search region may be jointly evaluated with the features of each candidate suspicious polyp in the corresponding supine search region. All combinations of candidate suspicious polyps in the search region represent candidate match pairs. For example, given 3 candidate suspicious polyps in a prone colonic region and 2 candidate suspicious polyps in the corresponding supine colonic region, 6 candidate match pairs may be evaluated in accordance with step 520.

In one embodiment of step 520, candidate match pairs may be eliminated as potential matches (i.e., assigned a 0% or other suitable insignificant probability of match) using an expert filter. The expert filter may identify obvious differences between features that makes it impossible (or nearly impossible) for a candidate match pair to be the same polyp. For example, assume a candidate suspicious polyp that is a polyp is detected in the prone volume and a candidate suspicious polyp that is stool is detected in the supine volume in the same registered search area. Stool often exhibits a substantially different texture than polyps. Thus, a simple decision rule or threshold operation may be applied against, for example, one or more texture feature values of the potential match pair to identify the anomalies as a non-match. A classifier such as a decision tree could also be used such that if the texture feature did not conclusively eliminate the anomalies as a non-match, another feature describing, for example, the sizes of the potential match pair could then be used in conjunction with the texture feature. A large, high-texture structure may be more indicative of stool while a smaller, low-texture structure may be more indicative of a polyp.

In another embodiment of step 520, candidate match pairs may be classified by extracting features from both candidate suspicious polyps and characterizing the similarity of each candidate match pair in feature vector space using a classification algorithm. The feature vector may be formed using any suitable combination of features useful in characterizing a similarity of two anomalies, such as, but not limited to, a size feature measurement, a brightness feature measurement, a texture feature measurement, a distance from centerline feature measurement, and/or a volume feature measurement. Calculations for such features are all described in the prior art. The similarity of the pair may be characterized by computing a distance between the feature vectors of each candidate suspicious polyp in the pair using, for example, a cost function, a least squares function, or other suitable means for computing a similarity metric between feature vectors. The distance may then be used to compute a probability of match, such that the smaller the distance in feature vector space between pair features, the higher the probability of match. In embodiments where the system and methods described herein are performed on colon volumes taken of a patient at substantially different times (e.g., 5 or 10 years between the times that the images are acquired), the feature vector of the potential match pairs may be evaluated so that growth or changes of candidate suspicious polyps may be accounted for. In other words, the similarity metric may be weighted to account for changes between certain features, such as size and/or volume features, because polyps may be expected to change between times that the images are acquired whereas certain polyp-like false positives may not exhibit such growth characteristics. Such similarity metric weighting would not be used for comparing candidate suspicious polyps acquired at nearly the same time as such growth characteristics would not be expected by polyps in that comparison.

In one embodiment, a linear classifier may be used to characterize the similarity of each candidate match pair in feature vector space. However, any suitable classification algorithm may be employed such as, but not limited to, a quadratic classifier, a neural network classifier, a decision-tree classifier, a fuzzy logic classifier, a support vector machine (SVM) classifier, a Bayesian classifier, a k-nearest neighbor classifier, or a syntactical classifier. (See *Pattern Classification*, Duda et al., John Wiley & Sons, New York, October 2000).

In a non-limiting embodiment of the disclosure, a hybrid approach may be performed at step 520 that first applies one or more expert filters to eliminate highly unlikely potential matches in each colonic region, and then applies feature vector space classification to compute a probability of match between only "remaining" candidate match pairs. One skilled in the art will appreciate that a classification algorithm trained from the feature vectors of only likely true positive match pairs and likely false positive match pairs in a given search area may achieve higher match sensitivities than a classification algorithm trained also using the feature vectors of unlikely potential matches that may be discarded using expert filters prior to training such a classification algorithm.

In search areas where only a single candidate match pair may be identified, in another non-limiting embodiment of the disclosure, matching information may still be computed by performing step 520, as the two candidate suspicious polyps may not necessarily be the same structure or tissue. It may be disadvantageous to automatically assume that both are the same structure, simply because they are the only two candidate suspicious polyps in a registered colon region. However, alternatively, the candidate match pair may be automatically classified as a match.

Candidate suspicious polyps may also be matched using more than two views of an anatomical colon, such as in cases where it may be desirable to identify suspicious polyp anomalies using information obtained from a colon both at different points in time and from different viewpoint angles discussed herein above. In such cases, rather than evaluate candidate match pairs, features of candidate match triplets, quadruplets, etc. may be used to compute match information.

The match information computed is not designed to determine if each candidate suspicious polyp is a suspicious polyp or a non-polyp. The match information is computed to determine the possibility that a representation of a candidate suspicious polyp in one view may be identified in at least one other view of the anatomical colon.

Again referencing FIG. 4, each candidate suspicious polyp is then labeled (i.e., classified) as belonging to a specific class at suspiciousness classification step 440. As described hereinabove by way of one example, each candidate suspicious polyp may be labeled or classified to either a "true positive class" (i.e., as being a polyp) or a "false positive class" (i.e., as not being a polyp). According to an embodiment of the disclosure, the match information computed at step 430 is used to determine, for each candidate suspicious polyp detected in one volume of the colon, whether the polyp should be classified jointly using its features and the features extracted from at least one "match" in another view or whether the polyp should be classified singularly based on only its features alone.

In a non-limiting embodiment of the disclosure, a candidate suspicious polyp in one volume may be classified jointly with a matched candidate suspicious polyp in another volume if a probability of match computed between the candidate match pair at step 430 exceeds a predetermined match threshold. The match threshold acts as a confidence measure to ensure that candidate match pairs having poorly correlated features are not jointly evaluated, as this may undesirably decrease the accuracy of the methods disclosed herein. For example, an empirically-determined match threshold of 50% may be used, although this parameter is merely exemplary and a different match threshold parameter may be employed to account for changes in sensitivities of the candidate detection, registration, and matching steps discussed above and the accuracy of suspiciousness classification discussed below. In instances where multiple candidate match pairs exceed the predetermined match threshold, in another non-limiting embodiment of the disclosure, the candidate match pair with the highest probability of match may be selected for joint suspiciousness classification. In such cases, the pair of candidate suspicious polyps under such an evaluation is henceforth referred to as a "matched suspicious polyp pair." In an alternate embodiment, all candidate match pairs exceeding the predetermined match threshold may be jointly analyzed as will be further described below. In such cases, the candidate suspicious polyps under such an evaluation are henceforth referred to as a "matched suspicious polyp family." Pairs, families, and any other combination of candidate suspicious anomalies from the same or different views that it is desirable to consider together for analysis purposes may be referred to hereinafter as "sets" or "matched sets." It will be understood that a set may be a pair, a family or another appropriate combination of candidate anomalies. All candidate suspicious polyps for which no match was identified or for which no match exceeded the predetermined match threshold are henceforth referred to as "single-view suspicious polyps."

In one embodiment of suspiciousness classification step 440, a matched suspicious polyp pair may be labeled as belonging to a specific class (e.g., such as belonging to a false positive class) by applying an expert filter to features of the pair. The expert filter may analyze obvious features that make it impossible (or nearly impossible) for a matched suspicious polyp pair to belong to a specific class (for example, features that make it impossible for the pair to be a polyp). For example, while stool will be often be detected and matched in a region of a colon, stool will often move from one side of the colon to another (i.e., fall to the dependent side of the colon) while polyps will not. Thus, a simple decision rule or threshold operation may be applied against, for example, at least one location-based feature extracted from both candidate suspicious polyps in the pair to characterize the likelihood that it physically "moved" from one colon position to another, which may then be used to classify the candidate suspicious polyps to a false positive class. A classifier such as a decision tree could also be used such that features describing, for example, the texture of the intensities of the matched suspicious polyp pair could then be used in conjunction with the location feature(s) to correctly classify the pair. Two high-intensity, high-texture structures that are mobile in the colon may be even more indicative of a false positive (and more specifically, of tagged stool). As is known in the art, the output of an expert filter may either be a hard decision (e.g., both candidate suspicious polyps in the pair are classified as belonging to a false positive class or more specifically, to a stool false positive class) or a soft decision (i.e., both candidate suspicious polyps in the pair are jointly assigned a 0% or other suitable insignificant probability of belonging to a true positive class).

In another embodiment of step 440, matched suspicious polyp pairs may be classified by extracting features from both candidate suspicious polyps in the pair and characterizing the suspiciousness of the pair in feature vector space using a classification algorithm. The vectors may be formed using any suitable combination of features useful in distinguishing polyps from polyp-like false positives, such as, but not limited to, an elliptical curvature feature measurement, a Gaussian curvature feature measurement, a mean curvature feature measurement, an aspect ratio feature measurement, a shape index feature measurement, an intensity feature measurement, and/or a sphericity feature measurement. Feature measurements describing the angle of each anomaly relative to the colon wall may be measured to characterize the difference in which the structure hangs from different views as, for example, pedunculated polyps may be likely to "hang" in one view and be "folded over" in another view. The features themselves may be computed on different portions of the candidate suspicious polyps, such as features describing the neck of the structure. In a non-limiting embodiment, both vectors comprise the same set of features as a means to measure the suspiciousness of the pair. However, each vector may also be formed using different features as an alternate means to measure the suspiciousness of the pair.

By way of a non-limiting example, the ileocecal valve, a term which also encompasses reference to portions or sections of the ileocecal valve, is a common source of false positives for polyp detection algorithms. Thus, to distinguish polyps from the ileocecal valve, a feature vector may be formed by forming a feature vector space by extracting at least one feature value from matched suspicious polyp pairs in both views that have an ability to discriminate polyps from the ileocecal valve. Three such examples include a location feature, an intensity feature, and/or a size feature. Any additional features, such as the exemplary curvature features cited hereinabove, may be combined with a location feature, an intensity feature, and/or a size feature to further distinguish polyps from the ileocecal valve as well as other matching non-polyps, which allows the classification of each candidate suspicious polyp into a true positive or a false positive class.

In a non-limiting embodiment of the disclosure, the feature vector space for characterizing the suspiciousness of the pair may be formed from the extracted features by computing a weighted average between features of the pair. The weights applied to the features may be empirically predetermined or preset in memory unit 124. Alternatively, the weights to apply to the features may be computed dynamically based upon, for example, a single feature measurement of at least one of the candidate suspicious polyp in the matched suspicious polyp pair. By way of a non-limiting example, the feature measurement may be a height measurement of the neck of both candidate suspicious polyps as a means to characterize whether the matched suspicious polyp pair is a matching pedunculated polyp that "hangs" in one view (based on a long neck height measurement) and is "folded over" in another view (based on a shorter neck height measurement). A larger weight may be dynamically applied to the features extracted from the candidate suspicious polyp that "hangs" to measure the suspiciousness of such pairs. There may be other ways to dynamically determine the weights to apply to the vectors such as, but not limited to, a local or region-based image quality operation, such as an operation that seeks to identify the presence of streak artifacts in the colonic region of one view and applies a smaller weight to the features extracted in this view. In further embodiments of the disclosure, rather than compute a weighted average between features, a feature vector space for characterizing the suspiciousness of the pair may be formed by selecting the maximum, median, or minimum feature value from each feature of the pair.

In embodiments contemplated where at least one suspicious polyp family or set may be formed in matching, features from all candidates in a family or set may be classified at step 440.

According to an embodiment of the disclosure, single-view suspicious polyps may be labeled as belonging to a class at step 440 by forming a single vector of features extracted from only the single-view candidate suspicious polyp and classifying the single vector using a classification algorithm. A probability may be used to label the candidate suspicious polyp as belonging to a class.

Any suitable classification algorithm may be employed to classify the extracted feature vectors such as, but not limited to, those classification algorithms cited hereinabove. In one embodiment, a linear classifier may be used at step 440. The classification algorithm may output a single probability of suspiciousness (e.g., candidate suspicious polyp(s) are 92% likely to belong to a true positive polyp class). Alternatively, the classification algorithm may compute a hard decision, such as whether candidate suspicious polyps are classified as belonging to either a true positive class or a false positive class. The classification algorithm may be constructed to output more than a two-class decision.

Figure 6:
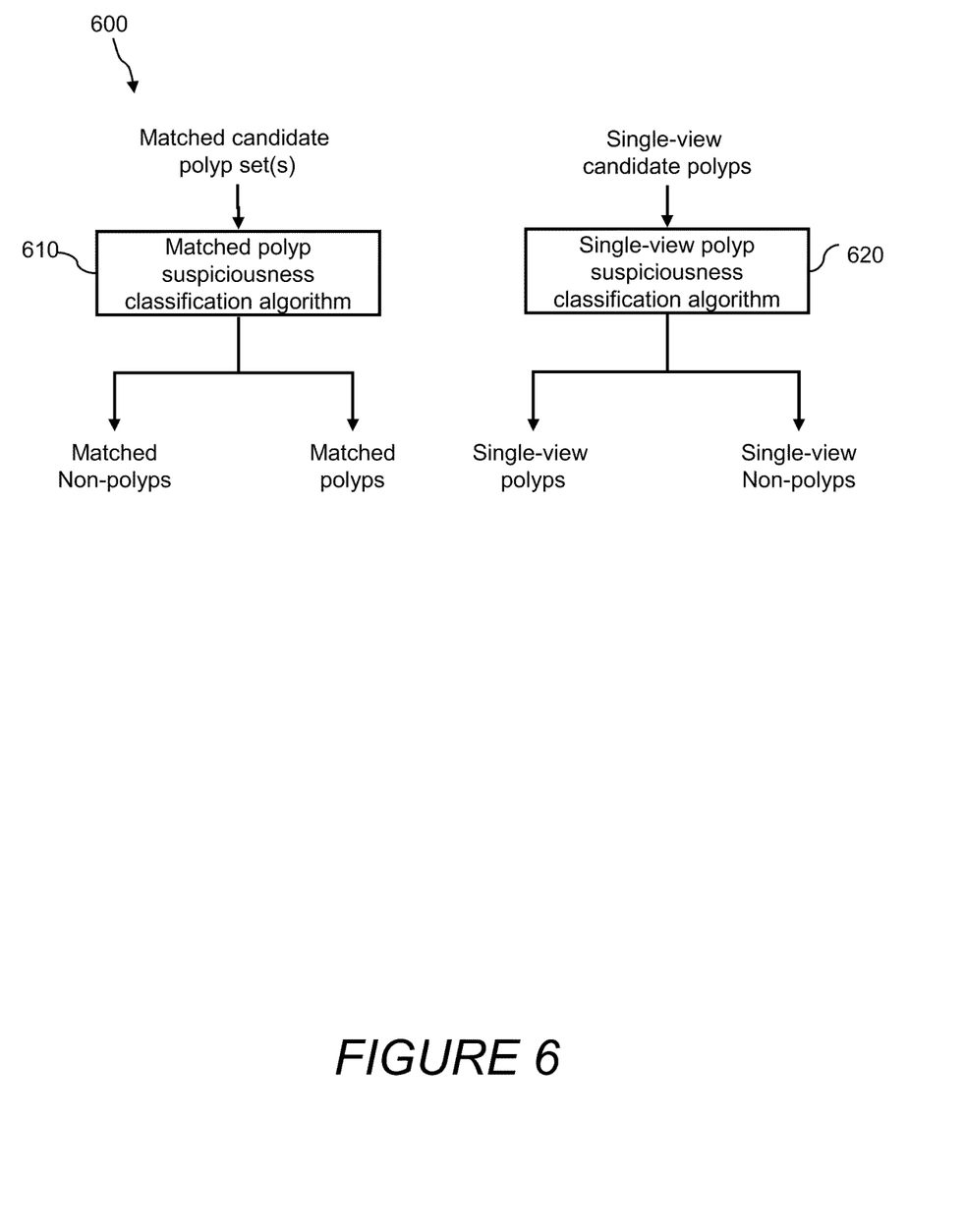
FIG. 6 is a flowchart showing a method that may be performed to classify matching and non-matching candidate suspicious polyps identified in a plurality of images of an anatomical colon under study in accordance with certain embodiments of the systems and methods disclosed herein.

FIG. 6 illustrates an alternate method 600 of classifying suspicious polyps at step 440 based on match information. As illustrated in FIG. 6, a matched polyp classification algorithm 610 may be invoked and executed to classify candidate suspicious polyp pairs or families. Matched polyp classification algorithm 610 may be trained from and store the parametric characteristics that distinguish digital representations of polyps that appear (i.e., "match") across multiple views of an anatomical colon from digital representations of polyp-like false positives that also appear (i.e., "match") across multiple colon views. Features extracted from suspicious polyp pairs or families may be analyzed using matched polyp classification algorithm 610 to label the candidates as belonging to a specific class (for example, a matching true positive polyp class or a matching false positive polyp class). In contrast, a single-view polyp classification algorithm 620 may be invoked and executed to classify single-view candidate suspicious polyps. Single-view polyp classification algorithm 620 may be trained from and store the parametric characteristics that distinguish digital representations of polyps that appear in a single view of an anatomical colon (e.g., do not "match" across multiple views) from digital representations of polyp-like false positives that also appear in only a single view. Features extracted from single-view suspicious polyps may be analyzed using single-view polyp classification algorithm 620 to label the candidates as belonging to a specific class (for example, a single-view true positive polyp class or a single-view false positive polyp class).

By separating candidate suspicious polyps into two groups based on whether at least one match can be identified in another colon view, an additional layer of class separability between polyps and non-polyps may be realized in the embodiments illustrated with reference to FIG. 6. For example, as previously discussed, while a feature vector formed from at least a location feature, an intensity feature, and a size feature may be useful in distinguishing matching polyps from the ileocecal valve, the ileocecal valve will typically persist across differing (i.e., supine and prone) volumes of an anatomical colon volume and thus, will typically be detected and "matched" in accordance with the methods disclosed herein. Thus, location, intensity, and size may not be the most useful characteristics for distinguishing polyps appearing in only a single view from non-polyps appearing in only a single view. By training and invoking separate classification algorithms in accordance with whether candidate suspicious polyps match across colon views or not, each individual classification algorithm may distinguish polyps from non-polyps with greater accuracy (i.e., discrimination power).

In further embodiments not depicted in FIG. 6, probabilities of suspiciousness output by the respective classification algorithms for multiple true positive classes (i.e., a matched true positive class and a single-view true positive class) may be fused together to jointly label a single class of true positives that should be output to a physician or other user of the system. The probabilities of all suspicious polyps, regardless of single-view, pair, or family classification, may be compared against a single predetermined threshold corresponding to a desired system operating point (i.e., sensitivity/false positive rate). One means for calculating an optimal threshold for a plurality of classification algorithms at a single, given, system operating point is a Pareto front, which is known in the art. There are many techniques for fusing the results of classification algorithms that may be used. For example, various examples of such techniques can be seen in "A Theoretical Study on Six Classifier Fusion Strategies" by Ludmilla I. Kuncheva, IEEE TRANSACTIONS ON PATTERN ANALYSIS AND MACHINE INTELLIGENCE, VOL. 24, NO. 2, FEBRUARY 2002 281-286. Alternatively, each true positive class may be compared against different predetermined thresholds corresponding to a single desired system operating point. This enables a greater number of suspicious polyps assigned to a particular true positive class (e.g., the match true positive class) to be presented to the physician.

Again referencing FIG. 2, at suspicious anomaly output step 230, candidate suspicious polyps classified to a specific class (e.g., a true positive polyp class) may be output to a physician for inspection. Generally speaking, a physician initiates suspicious polyp detection operations such as those described at step 220 after he or she has manually reviewed the imagery acquired at step 210 and identified suspicious polyps of interest. Thus, the computer system performing such suspicious polyp detection operations acts as a second set of "eyes" to confirm the manual findings of the physician and/or identify other anomalies that he or she may have missed or originally dismissed. Thus, to prevent a physician from re-reviewing the entire anatomical colon, imagery of portions of the colon at the locations of each suspicious polyp are typically rendered and displayed. Thus, in accordance with the conventional operation of prior art CAD systems, one or more candidate suspicious polyps classified to a true positive class at step 220 may be output at step 230 by rendering a portion of the anatomical colon using a single volume and displaying the rendered portion on an output device such as GUI 140. There are numerous means described in the prior art for rendering and displaying a portion of the anatomical colon in ways that are suitable for a physician to inspect suspicious polyps an output device such as GUI 140 including, but not limited to: U.S. Pat. Nos. 5,782,762, 5,920,319, 6,083,162, 6,272,366, 6,366,800, 6,694,163, 6,909,913, and 7,149,564 to Vining et al.; U.S. Pat. Nos. 5,891,030 and 6,928,314 to Johnson et al.; and U.S. Pat. Nos. 5,971,767 and 6,514,082 to Kaufman et al., all of which are incorporated herein by reference. In a non-limiting embodiment of the disclosure, a virtual endoscopic or "fly-through" view of the colon may be rendered and displayed to present each suspicious polyp.

Upon a command from the physician via an input device such as keyboard 136 or mouse 138, additional suspicious polyps belonging to a particular class (such as a true positive class) may be presented by rendering and displaying different portions of the anatomical colon from this single volume. After presenting all suspicious polyps in that class using imagery of a single volume, upon additional commands from the physician via the input device, suspicious polyps belonging to that class may be presented using other views of the anatomical colon by rendering and displaying a portion of the anatomical colon from alternate volume(s) acquired at step 210. For example, after reviewing all true positive suspicious polyps identified in the prone volume, the physician may then be presented with each true positive suspicious polyp identified in the supine volume. This is one example of the workflow of physicians who review suspicious polyps identified by automated methods such as computer-aided detection. The physician may toggle between imagery to compare a suspicious polyp in one view with a suspicious polyp in another view. In the prior art the physician generally is required to manually identify such correspondence (by navigating or "flying-through" the virtual endoscopic imagery, for example), but in the systems and methods disclosed herein the toggling may be automatic.

All suspicious polyps may be specially depicted from the colon imagery using a distinct marker (e.g., a distinct color, a distinct shape, a distinct arrow, etc.). (See, for example, "Coloring voxel-based objects for virtual endoscopy," Shibolet et al., *IEEE Symposium on Volume Visualization*, p. 15-22, October 1998.) In accordance with a non-limiting embodiment, the suspicious polyps may be further specially depicted depending on whether each suspicious polyp was classified to a true positive class by using information in a single-view or by using information in multiple views of the colon. For example, single-view suspicious polyps classified to a true positive class may be specially depicted using a first distinct marker, such as a single circle. The use of such a distinct marker conveys to the physician that the system and methods disclosed herein identified no corresponding suspicious polyp in a corresponding volume. This may prompt the physician to take additional action in the corresponding volume, depending on his or her manual evaluation of the suspicious polyp in the single-view. For example, if the physician also deemed the finding suspicious, he or she may carefully review a larger portion of the colon in the other view to inspect other nearby structures. Conversely, matched suspicious polyp pairs, sets or families classified to a true positive class may be specially depicted using a second distinct marker, such as a double circle. The use of such a distinct marker conveys to the physician that the CAD system and methods disclosed herein used such information in assessing its suspiciousness, which may prompt the physician to jointly review specific features of the pair, set or family to further assess suspiciousness. In accordance with a further non-limiting embodiment, each matched polyp pair, set or family may be further specially depicted from other matched polyp pairs or families. This may be a particularly useful guide in regions of a colon where multiple suspicious polyp pairs are identified and presented. By way of an example, each double circle may be uniquely color-coded and/or annotated with a unique numerical identifier to indicate that a particular suspicious polyp in a prone colon volume was matched against and jointly evaluated with a particular suspicious polyp in a supine colon volume.

Any of the aforementioned special depiction techniques or variables may further be implemented and stored as an "option" in memory unit 124 of image viewing station 120. Each "option" and/or variable may further be presented graphically to a user via GUI 140 and may be selected or changed via an input interface 126 such as keyboard 136, mouse 138, and/or other suitable device. The option may be presented, for example, as an on/off toggle. This may provide the physician with control as to whether the information pertaining to how the CAD system arrived at a decision for each suspicious polyp is displayed. In certain cases, it is assumed that the physician may prefer not to understand whether a corresponding suspicious polyp was identified in another volume.

Figure 7:
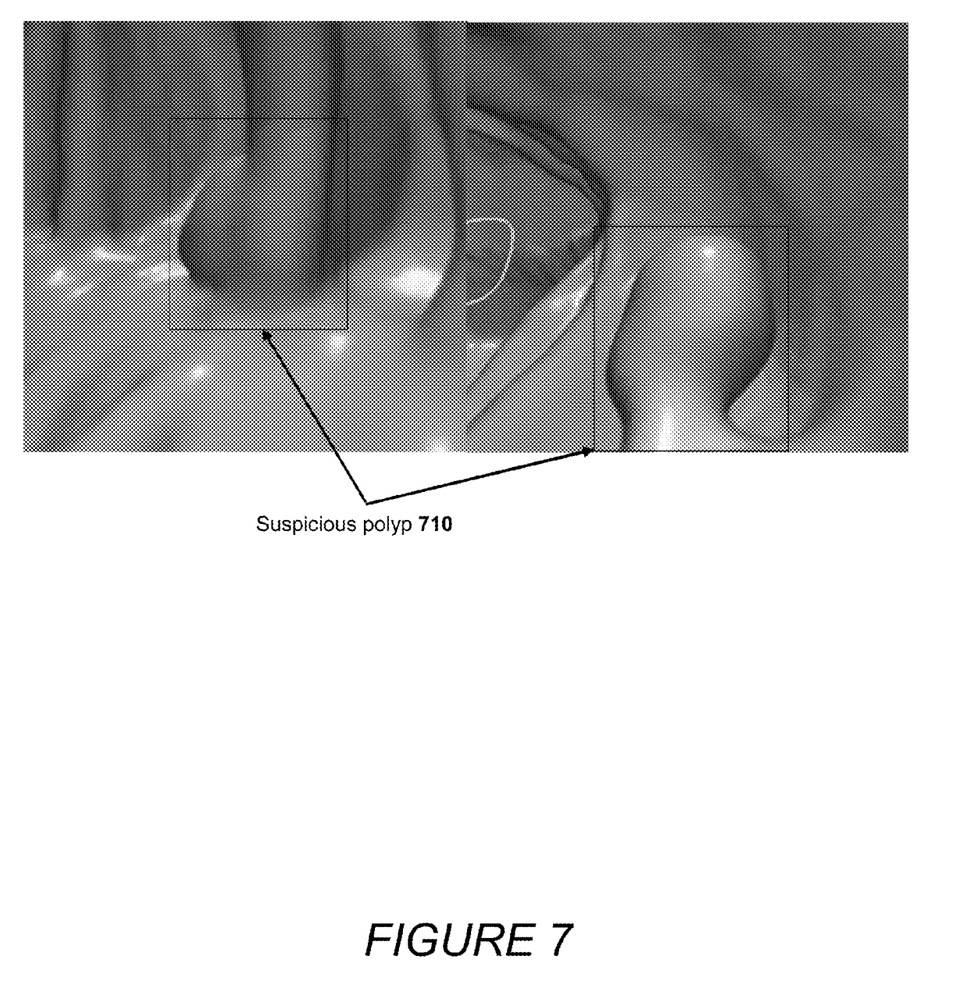
FIG. 7 illustrates an example of digital imagery output by a graphical user interface for simultaneously presenting a suspicious polyp automatically identified using information from both a prone volume and a supine volume of an anatomical colon under study.

Conversely, one feature provided by the systems and methods disclosed herein is the capability to synchronize a review of suspicious polyps identified in different volumes (i.e., prone and supine) that appear to be the same suspicious polyp. One drawback to the rendering and display output method common in the prior art CAD systems described hereinabove is that the physician is not automatically presented with synchronized imagery of matched suspicious polyp pairs in both volumes. Instead, the physician must manually synchronize such imagery to allow a simultaneous suspiciousness evaluation of both structures. Thus, in accordance with an embodiment of the disclosure, at step 230, synchronized, corresponding portions of the anatomical colon under study may be automatically rendered using the plurality of volumes acquired at step 210 in accordance with the locations of matching suspicious polyp pairs. In embodiments in which a single-view suspicious polyp is shown, synchronized imagery may also be presented. In such embodiments, information obtained from registration at step 420 may be used to render a portion of a volume at approximately the same corresponding location at which the suspicious polyp was expected to have appeared. These rendered portions may then be simultaneously displayed on GUI 140 to facilitate a simultaneous evaluation. FIG. 7 illustrates an example of digital imagery that may be output by GUI 140 for simultaneously presenting a suspicious polyp 710 jointly classified as a suspicious polyp in both a prone volume and a supine volume of the anatomical colon under study. While the suspicious polyp in FIG. 7 is specially depicted from other colonic structures in this imagery using a bounding box, any of the special depiction techniques described hereinabove or known to those of skill in the art may also be used in such embodiments. In a non-limiting embodiment, the suspicious polyps may be specially depicted in both images using a double circle that is uniquely color-coded to indicate that these two structures were matched and jointly classified as polyps in accordance with the methods described herein. Upon a command from the physician via an input device such as keyboard 136 or mouse 138, additional suspicious polyps may be presented by rendering and displaying additional synchronized portions of the anatomical colon from the multiple volumes. In further embodiments, a synchronized mosaic image of multiple suspicious polyps across multiple volumes may be presented.

While the methods and systems disclosed herein have been described with reference to specific embodiments pertaining to the identification of suspicious polyps in a colon, the methods and systems disclosed herein may also be used to identify other suspicious anomalies that may be of interest to a physician. For example, by performing the suspicious colonic residue (i.e., stool) detection and classification techniques described in our pending U.S. application Ser. No. 12/179,787 to Collins et al. on individual prone and supine images of an anatomical colon, one may then perform equivalent registration, matching, and suspiciousness classification steps disclosed herein as a means to identify stool from non-stool using a plurality of images of the patient's anatomical colon.

Having described the system, computer-readable medium, and methods disclosed herein in detail and by reference to specific embodiments thereof, it will be apparent that modifications and variations are possible without departing from the scope of this disclosure. More specifically, although some aspects of this disclosure may be identified herein as preferred or particularly advantageous, it is contemplated that the methods and systems disclosed herein are not necessarily limited to these preferred aspects.

The invention claimed is:

1. A method for identifying suspicious anomalies in an anatomical colon under study, the method comprising the steps of:
   identifying a plurality of features in each of a first image of the anatomical colon and a second image of the anatomical colon;
   applying a match classifier to the plurality of features in each of the first image of the anatomical colon and the second image of the anatomical colon to determine a matched set of features contained in the first image of the anatomical colon and the second image of the anatomical colon;
   associating the matched set of features with at least one region within the anatomical colon; and
   applying a suspiciousness classifier selectively to the matched set of features in the at least one region to identify at least one suspicious anomaly.

2. The method as set forth in claim 1 wherein the suspiciousness classifier is applied to the at least one region based upon a colon-based suspiciousness feature of the at least one region.

3. The method as set forth in claim 1 wherein the suspiciousness classifier is applied to the at least one region based upon a location of the at least one region within the anatomical colon.

4. The method as set forth in claim 1 wherein the suspiciousness classifier is applied to the at least one region based upon a colon-based suspiciousness feature related to the at least one region of the anatomical colon.

5. The method as set forth in claim 1 further comprising the step of outputting to a user digital imagery identifying the at least one candidate suspicious anomaly classified as belonging to a true positive class.

6. The method as set forth in claim 5 wherein the at least one candidate suspicious anomaly from a matched set of candidate suspicious anomalies classified as belonging to a true positive class is specially depicted using a first notation.

7. The method as set forth in claim 6 wherein the first notation comprises a double circle.

8. The method as set forth in claim 1 wherein the at least one region is one of a plurality of separate regions within the anatomical colon.

9. The method as set forth in claim 1 wherein the first image of the anatomical colon and the second image of the anatomical colon are acquired with respect to a patient in two different positions.

10. The method as set forth in claim 9 wherein at least one position of the two different positions comprises one of: a prone position, a supine position, a left decubitus position and a right decubitus position.

11. The method as set forth in claim 1 wherein first image of the anatomical colon and the second image of the anatomical colon are acquired at different times.

12. The method as set forth in claim 1 wherein the first image of the anatomical colon and the second image of the anatomical colon are acquired by employing a computed tomography (CT) or a magnetic resonance (MR) colonography non-invasive colon imaging procedure.

13. The method as set forth in claim 1 wherein the at least one suspicious anomaly is a suspected polyp.

14. The method as set forth in claim 1 further comprising the step of storing information with respect to at least one unmatched candidate suspicious anomaly classified as belonging to a true positive class.

15. The method as set forth in claim 14 further comprising outputting to a user digital imagery identifying the at least one unmatched candidate suspicious anomaly classified as belonging to a true positive class.

16. The method as set forth in claim 15 wherein the at least one unmatched candidate suspicious anomaly classified as belonging to a true positive class is specially depicted using a second notation.

17. The method as set forth in claim 16 wherein the second notation is a single circle.

18. The method as set forth in claim 14 further comprising the step of classifying the at least one unmatched candidate suspicious anomaly as belonging to a false positive class.

19. The method as set forth in claim 1 further comprising the step of classifying the at least one suspicious anomaly as belonging to a false positive class.

20. The method as set forth in claim 19 further comprising the step of classifying the at least one suspicious anomaly as belonging to a stool class.

21. A non-transitory computer readable medium containing executable program instructions for identifying suspicious anomalies in an anatomical colon under study, the executable program instructions for performing the steps of:

identifying a plurality of features in each of a first image of the anatomical colon and a second image of the anatomical colon;

applying a match classifier to the plurality of features in each of the first image of the anatomical colon and the second image of the anatomical colon to determine a matched set of features contained in the first image of the anatomical colon and the second image of the anatomical colon;

associating the matched set of features with at least one region within the anatomical colon; and applying a suspiciousness classifier selectively to the matched set of features in the at least one region to identify at least one suspicious anomaly.

22. The non-transitory computer readable medium as set forth in claim 21 wherein the suspiciousness classifier is applied to the at least one region based upon a colon-based suspiciousness feature of the at least one region.

23. The non-transitory computer readable medium as set forth in claim 21 wherein the suspiciousness classifier is applied to the at least one region based upon a location of the at least one region within the anatomical colon.

24. The non-transitory computer readable medium as set forth in claim 21 wherein the suspiciousness classifier is applied to the at least one region based upon a colon-based suspiciousness feature related to the at least one region of the anatomical colon.

25. The non-transitory computer readable medium as set forth in claim 21 further comprising the step of outputting to a user digital imagery identifying the at least one candidate suspicious anomaly classified as belonging to a true positive class.

26. The non-transitory computer readable medium as set forth in claim 25 wherein the at least one candidate suspicious anomaly from a matched set of candidate suspicious anomalies classified as belonging to a true positive class is specially depicted using a first notation.

27. The non-transitory computer readable medium as set forth in claim 26 wherein the first notation comprises a double circle.

28. The non-transitory computer readable medium as set forth in claim 21 wherein the at least one region is one of a plurality of separate regions within the anatomical colon.

29. The non-transitory computer readable medium as set forth in claim 21 wherein the first image of the anatomical colon and the second image of the anatomical colon are acquired with respect to a patient in two different positions.

30. The non-transitory computer readable medium as set forth in claim 29 wherein at least one position of the two different positions comprises one of: a prone position, a supine position, a left decubitus position and a right decubitus position.

31. The non-transitory computer readable medium as set forth in claim 21 wherein first image of the anatomical colon and the second image of the anatomical colon are acquired at different times.

32. The non-transitory computer readable medium as set forth in claim 21 wherein the first image of the anatomical colon and the second image of the anatomical colon are acquired by a computed tomography (CT) or a magnetic resonance (MR) colonography non-invasive colon imaging procedure.

33. The non-transitory computer readable medium as set forth in claim 21 wherein the at least one suspicious anomaly is a suspected polyp.

34. The non-transitory computer readable medium as set forth in claim 21 further comprising the step of storing information with respect to at least one unmatched candidate suspicious anomaly classified as belonging to a true positive class.

35. The non-transitory computer readable medium as set forth in claim 34 further comprising outputting to a user digital imagery identifying the at least one unmatched candidate suspicious anomaly classified as belonging to a true positive class.

36. The non-transitory computer readable medium as set forth in claim 35 wherein the at least one unmatched candidate suspicious anomaly classified as belonging to a true positive class is specially depicted using a second notation.

37. The non-transitory computer readable medium as set forth in claim 36 wherein the second notation is a single circle.

38. The non-transitory computer readable medium as set forth in claim 34 further comprising the step of classifying the at least one unmatched candidate suspicious anomaly as belonging to a false positive class.

39. The non-transitory computer readable medium as set forth in claim 21 further comprising the step of classifying the at least one suspicious anomaly as belonging to a false positive class.

40. The method as set forth in claim 39 further comprising the step of classifying the at least one suspicious anomaly as belonging to a stool class.

41. A system for identifying suspicious anomalies in an anatomical colon under study, the system comprising:
   an input interface operatively connected to a processor unit to communicate commands to the processor unit to identify suspicious anomalies in a first image of the anatomical colon and a second image of the anatomical colon;
   an output interface operatively connected to the processor unit to transmit medical imagery from the processor unit to an output device;
   at least one suspicious anomaly of the suspicious anomalies provided with the medical imagery, the at least one suspicious anomaly being identified by applying a match classifier to a plurality of features in each of the first image of the anatomical colon and the second image of the anatomical colon to define a matched set of features, and then selectively applying a suspiciousness classifier to the matched set of features that have been associated with at least one region within the anatomical colon.

42. The system as set forth in claim 41 further comprising a user digital imagery that outputs the at least one suspicious anomaly classified as belonging to a true positive class.

43. The system as set forth in claim 42 wherein the at least one suspicious anomaly classified as belonging to a true positive class is specially depicted using a first notation.

44. The system as set forth in claim 43 wherein the first notation comprises a double circle.

45. The system as set forth in claim 41 wherein the first image of the anatomical colon and the second image of the anatomical colon are acquired with respect to a patient in two different positions.

46. The system as set forth in claim 45 wherein at least one position of the two different positions comprises one of: a prone position, a supine position, a left decubitus position and a right decubitus position.

47. The system as set forth in claim 41 wherein first image and the second image are acquired at different times.

48. The system as set forth in claim 41 wherein the first image of the anatomical colon and the second image of the anatomical colon are acquired by employing a computed tomography (CT) or a magnetic resonance (MR) colonography non-invasive colon imaging procedure.

49. The system as set forth in claim 41 wherein the at least one suspicious anomaly is a suspected polyp.

50. The system as set forth in claim 41 further comprising a memory unit for storing information with respect to at least one unmatched candidate suspicious anomaly classified as belonging to a true positive class.

51. The system as set forth in claim 50 further comprising a user digital imagery identifying the at least one unmatched candidate suspicious anomaly classified as belonging to a true positive class.

52. The system as set forth in claim 51 wherein the at least one unmatched candidate suspicious anomaly classified as belonging to a true positive class is specially depicted using a second notation.

53. The system as set forth in claim 52 wherein the second notation is a single circle.

54. The system as set forth in claim 53 wherein f the at least one unmatched candidate suspicious anomaly is classified as belonging to a false positive class.

55. The system as set forth in claim 41 wherein the at least one suspicious anomaly is classified as belonging to a false positive class.

56. The system as set forth in claim 55 wherein the at least one suspicious anomaly is classified as belonging to a stool class.

57. The system as set forth in claim 55 wherein the at least one region is one of a plurality of separate regions within the anatomical colon.

58. A system for identifying suspicious anomalies in anatomical images, the system comprising:
   means for identifying a plurality of features in each of a first anatomical image and a second anatomical image;
   means for applying a match classifier to the plurality of features in each of the first anatomical image and the second anatomical image to determine a matched set of features contained in the first anatomical image and the second anatomical image;
   means for associating the matched set of features with at least one anatomical region; and
   means for applying a suspiciousness classifier selectively to the matched set of features in the at least one anatomical region to identify at least one suspicious anomaly.

59. A system for identifying suspicious anomalies in an anatomical colon under study, the system comprising:
   means for identifying a plurality of features in each of a first image of the anatomical colon and a second image of the anatomical colon;
   means for applying a match classifier to the plurality of features in each of the first image of the anatomical colon and the second image of the anatomical colon to determine a matched set of features contained in the first image of the anatomical colon and the second image of the anatomical colon; and
   means for applying a suspiciousness classifier selectively to the matched set of features to identify at least one suspicious anomaly.

* * * * *